US009162580B2

(12) United States Patent
Yamamoto et al.

(10) Patent No.: US 9,162,580 B2
(45) Date of Patent: *Oct. 20, 2015

(54) CHARGE CONTROL APPARATUS FOR VEHICLE

(75) Inventors: Naoki Yamamoto, Kawasaki (JP); Kazuhiko Okino, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 88 days.

This patent is subject to a terminal disclaimer.

(21) Appl. No.: 14/004,096

(22) PCT Filed: Mar. 1, 2012

(86) PCT No.: PCT/JP2012/055208
§ 371 (c)(1),
(2), (4) Date: Sep. 9, 2013

(87) PCT Pub. No.: WO2012/124489
PCT Pub. Date: Sep. 20, 2012

(65) Prior Publication Data
US 2014/0002025 A1    Jan. 2, 2014

(30) Foreign Application Priority Data
Mar. 11, 2011  (JP) .................................. 2011-054093

(51) Int. Cl.
*H02J 7/00*    (2006.01)
*B60L 11/18*   (2006.01)
(Continued)

(52) U.S. Cl.
CPC ......... *B60L 11/1811* (2013.01); *B60L 11/1844* (2013.01); *B60L 11/1861* (2013.01); *B60L 11/1875* (2013.01); *H01M 10/443* (2013.01);
(Continued)

(58) Field of Classification Search
CPC . H01M 10/44; H01M 10/5006; H02J 7/0021; H02J 7/0054; H02J 7/025; H02J 7/0068
USPC .................................................. 320/104, 109
See application file for complete search history.

(56) References Cited

U.S. PATENT DOCUMENTS 5,650,710 A      7/1997  Hotta
8,890,467 B2 *  11/2014  Almquist et al. ............. 320/104
(Continued)

FOREIGN PATENT DOCUMENTS

JP    07-073906 A    3/1995
JP    08-115747 A    5/1996
(Continued)

OTHER PUBLICATIONS

Chinese Office Action, Oct. 10, 2014, 6 pages.
(Continued)

*Primary Examiner* — Nghia Doan
(74) *Attorney, Agent, or Firm* — Foley & Lardner LLP

(57) ABSTRACT

When a timer charge time zone is set by a timer charge reservation means for allowing a user to designate a predetermined timer charge time zone and a target charge amount, and timer charge is carried out from a timer charge start time previously designated, it is judged whether or not the timer charge start time should be advanced, at a time earlier by a predetermined time period than the timer charge start time. Owing to the judgment, charge of a battery can be completed at a predetermined time without enhancing a required capacity of a heater.

4 Claims, 11 Drawing Sheets

(51) Int. Cl.
  *H01M 10/44* (2006.01)
  *H01M 10/48* (2006.01)
  *H02J 7/04* (2006.01)
  *H01M 10/63* (2014.01)
  *H01M 10/615* (2014.01)
  *H01M 10/66* (2014.01)

(52) U.S. Cl.
  CPC .......... *H01M 10/486* (2013.01); *H01M 10/615* (2015.04); *H01M 10/63* (2015.04); *H01M 10/66* (2015.04); *H02J 7/0073* (2013.01); *H02J 7/047* (2013.01); *Y02E 60/721* (2013.01); *Y02T 10/7005* (2013.01); *Y02T 10/705* (2013.01); *Y02T 10/7044* (2013.01); *Y02T 90/121* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | | |
|---|---|---|---|
| 2008/0036425 A1 * | 2/2008 | Tashiro et al. | 320/154 |
| 2010/0217485 A1 | 8/2010 | Ichishi | |
| 2013/0147432 A1 | 6/2013 | Yamamoto et al. | |
| 2013/0162027 A1 | 6/2013 | Yamamoto et al. | |

FOREIGN PATENT DOCUMENTS

| | | |
|---|---|---|
| JP | 11-150885 A | 6/1999 |
| JP | 2000-040536 A | 2/2000 |
| JP | 2009-136109 A | 6/2009 |
| JP | 2011-238428 A | 11/2011 |
| JP | 2012-029491 A | 2/2012 |
| WO | WO 2008/155977 A1 | 12/2008 |
| WO | WO 2010/038682 A1 | 4/2010 |
| WO | WO-2010/038682 A1 | 4/2010 |

OTHER PUBLICATIONS

USPTO Office Action, U.S. Appl. No. 13/818,060 (Feb. 10, 2015, 12 pages.
Chinese Office Action, Dec. 2, 2014, 6 pages.
USPTO Notice of Allowance (U.S. Pat. No. 5,329,219), U.S. Appl. No. 13/818,060, dated May 26, 2015.
USPTO Office Action (US 2005/0264257, US 2010/0292855, US 2010/0324765, US 2011/0316486, US 2013/0183554), U.S. Appl. No. 13/822,256, dated Jun. 19, 2015.

* cited by examiner

CHARGE CONTROL APPARATUS FOR VEHICLE

TECHNICAL FIELD

The present invention relates to a charge control apparatus for a vehicle capable of travelling using electric power of a battery.

BACKGROUND ART

Patent Literature 1 discloses a technology of charge control of a battery in a vehicle capable of travelling using electric power of the battery. In the Patent Literature 1, when it is judged that charge of the battery cannot be completed within a predetermined time period due to a prolonged charge time period caused by a temperature drop of the battery, the battery is heated by a heater before a preset time for starting charge of the battery so as to complete charge of the battery in the predetermined time period.

However, in order to complete heating of the battery before starting charge of the battery, it is necessary to heat the battery up to a predetermined temperature in a short period of time. In a case where a large-capacity battery useable as a power source for travel of the vehicle is heated, there occurs a problem that a required capacity of the heater becomes higher to thereby cause an increased cost.

CITATION LIST

Patent Literature

Patent Literature 1: Japanese Patent Application Unexamined Publication No. 08-115747

SUMMARY OF INVENTION

The present invention has been made in view of the above-described problem. An object of the present invention is to provide a charge control apparatus for a vehicle which is capable of completing charge of a battery at a predetermined time without enhancing a required capacity of a heater.

In order to achieve the above object, the charge control apparatus for a vehicle according to the present invention is constructed as follows. When a timer charge time zone is set by a timer charge reservation section for allowing a user to designate a predetermined timer charge time zone and a target charge amount (that is, a target amount of electric energy charged to the battery), and timer charge is carried out from a timer charge start time previously designated, the charge control apparatus judges whether or not the timer charge start time should be advanced, at a time earlier by a predetermined time period than the timer charge start time.

By judging whether or not the charge start time should be advanced, at a time earlier by a predetermined time period than the timer charge start time in a case where a battery charging power is reduced due to simultaneous implementation of the timer charge and the battery heating, the charge time period can be prolonged and shortage of a charged electric energy at the charge stop time can be avoided. Further, since the battery heating can be carried out during the timer charge, it is not necessary to enhance a required capacity of the heater, and therefore, an increased cost can be avoided.

DESCRIPTION OF EMBODIMENTS

Embodiment 1

Figure 1:
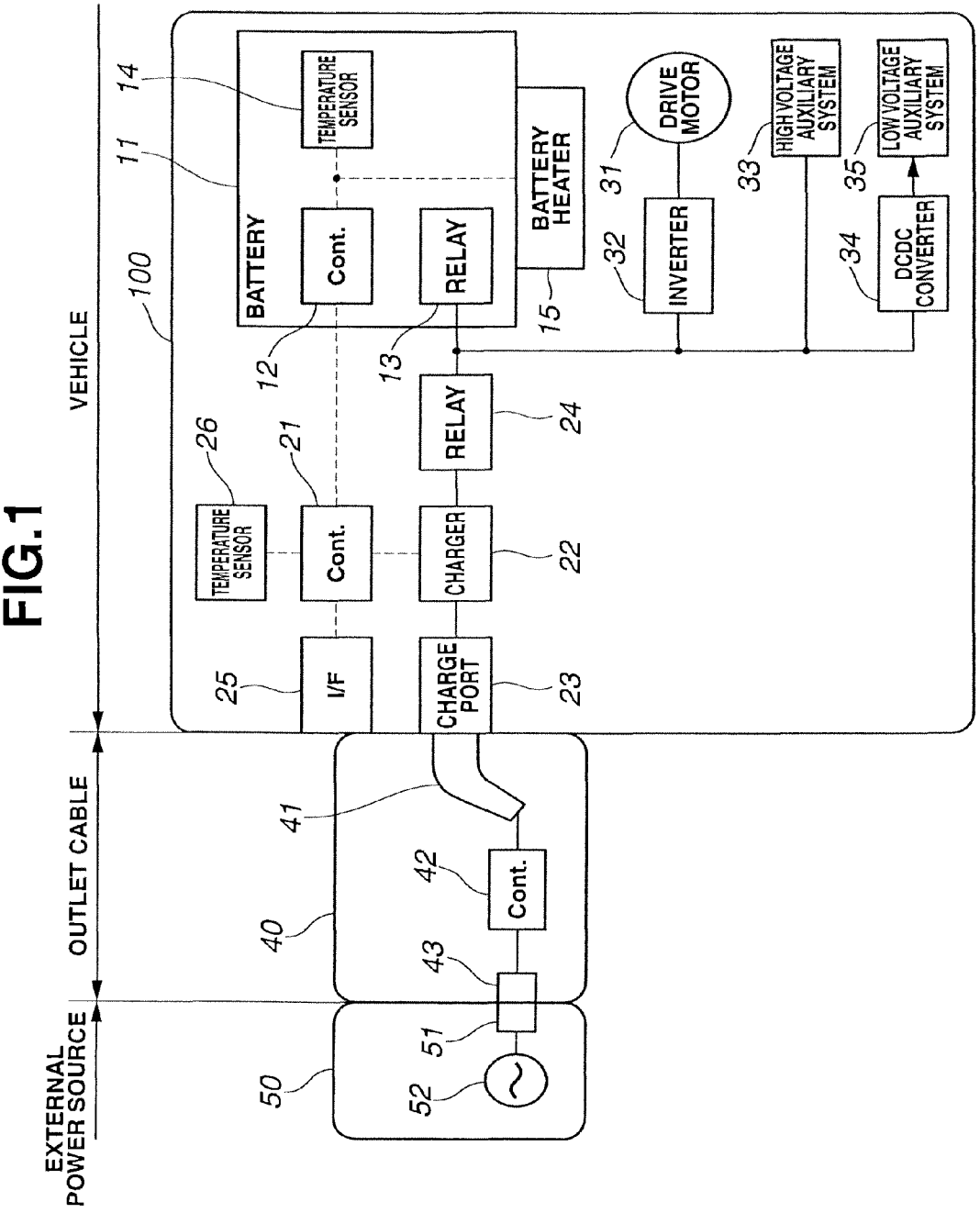
FIG. 1 is a general system diagram showing a charge control apparatus for a vehicle according to Embodiment 1.

FIG. 1 is a general system diagram showing a charge control apparatus for a vehicle according to Embodiment 1. The vehicle to which Embodiment 1 is applied is an electric automobile that can travel using a battery as a sole energy source. Electric vehicle 100 includes electrically chargeable/dischargeable battery 11, and can be driven by converting a direct current power stored in battery 11 into an alternating current power through inverter 32 and supplying the converted power to drive motor 31. Battery 11 is charged by receiving electric power of external power source 50 through outlet cable 40 that connects external power source 50 and electric vehicle 100 with each other. Generally, examples of external power source 50 may include a commercial power source that is used in the case of ordinary charge, and a boost charger that is used in the case of boost charge. FIG. 1 shows the case of ordinary charge. Commercial power source 52 is generally supplied with current through power outlet 51.

Outlet cable 40 includes inlet plug 43 connectable to power outlet 51, control box 42, and charging connector 41. Control box 42 has a function of interrupting electrical connection by detecting electric leakage in the system during a charge operation, and a function of transmitting a current capacity signal to the vehicle. Charging connector 41 is connectable to charging port 23 of electric vehicle 100. When external power source 50 and electric vehicle 100 are connected with each other through outlet cable 40, charge control device 21 is actuated to judge whether or not start of charge is carried out on the basis of preset charge mode. The charge mode includes instantaneous charge mode to instantaneously start charge of the battery, and timer charge mode to carry out start/stop of charge of the battery on the basis of a preset charge start time and/or a preset charge stop time.

Upon starting charge of battery 11, battery relay 13 and charging relay 24 are connected, and battery charger 22 recognizes a current capacity of outlet cable 40 on the basis of the current capacity signal outputted from control box 42, and controls input current from external power source 50 within a range of the current capacity. The alternating current power (voltage×current) inputted to battery charger 22 is converted into a direct current power in battery charger 22, and outputted with increased voltage. The electric power that is outputted by battery charger 22 is controlled in real time by charge control device 21, and is determined on the basis of battery charging electric power to be supplied to battery 11 which is requested by battery control device 12, outputtable electric power that battery charger 22 can output, and auxiliary consumed electric power that is consumed by high voltage auxiliary system 33, DCDC converter 34, and low voltage auxiliary system 35. DCDC converter 34 supplies direct current power with reduced voltage to low voltage auxiliary system 35.

During charge of battery 11, battery control device 12 (corresponding to battery control section) monitors SOC, voltage, temperature, etc. of battery 11, and determines charge requesting power on the basis of these monitoring results, and transmitted the determination results to charge control device 21. Supply of electric power to battery 11 is continued until battery 11 comes into a full charge state unless other specific instructions relating to a charge stop time and an electric energy amount to be charged are provided. When battery 11 is in the full charge state, battery control device 12 executes a judgment as to full charge on the basis of the SOC and the voltage of battery 11, and requests charge control device 21 to stop charge of battery 11 so that charge control device 21 stops charge of battery 11. When the charge of battery 11 is stopped, battery charging power that is inputted and outputted by battery charger 22 is reduced to zero, and battery relay 13 and charging relay 24 are disconnected.

Further, when the timer charge is carried out, charge control device 21 (corresponding to charge control section) determines a charge start time and/or a charge stop time on the basis of information as to the preset charge start time and/or the preset charge stop time. If the determined charge start time is delayed relative to the present time, the charge system is kept stopped until the charge start time even when outlet cable 40 is connected to external power source 50 and electric vehicle 100. The information as to the charge start time and/or the charge stop time in the timer charge may be stored in charge control device 21 by direct input through interface device 25 (corresponding to timer charge reservation section) by the user, or an optional charge mode may be selected from a plurality of preset charge modes by the user so that the charge start time and/or the charge stop time are determined by electric vehicle 100. Electric vehicle 100 also includes ambient temperature sensor 26.

Further, battery 11 has characteristics as follows. When the temperature of battery 11 becomes low, a charge time period is prolonged due to reduction of chargeable capacity or reduction of allowable charge current. Further, when the temperature of battery 11 is dropped to a freezing point, battery 11 cannot be charged and discharged. Therefore, battery heater 15 is mounted to electric vehicle 100 in order to heat battery 11 up to a predetermined temperature value or more and keep battery 11 at the predetermined temperature value or more. Battery 11 includes battery temperature sensor 14 that monitors the temperature of battery 11. In a case where the temperature of battery 11 is dropped to not higher than the predetermined temperature value, battery heater 15 is operated to heat battery 11 such that the temperature of battery 11 is raised to a target temperature value or more. Battery heater 15 is operated by the electric power supplied from battery 11 or battery charger 22.

In order to reduce the vehicle cost, it is necessary to provide a low output heater having a required minimum heater output to keep battery 11 at the target temperature value or more. In this case, a heater operating time period for raising the temperature of battery 11 is prolonged, and therefore, there arises much opportunity to carry out battery charge and battery heating at the same time. Particularly, in the charge mode such as the timer charge which is mainly used for electric power supply in a nighttime zone due to a low cost, the temperature of battery 11 is likely to be low, so that it is predicted that battery charge and battery heating are simultaneously carried out. Since an upper limit of output of battery charger 22 is determined by electric power of external power source 50, in a case where the battery charge and the battery heating are simultaneously carried out, there tends to occur a shortage of battery charging power by an amount of electric power consumed by battery heater 15. In order to solve such a problem, in Embodiment 1, when charge control device 21 predicts that the battery heating is carried out during charge of battery 11, a charge start time set at the present time is advanced to suppress occurrence of shortage of a charged electric energy at a charge stop time.

Figure 2:
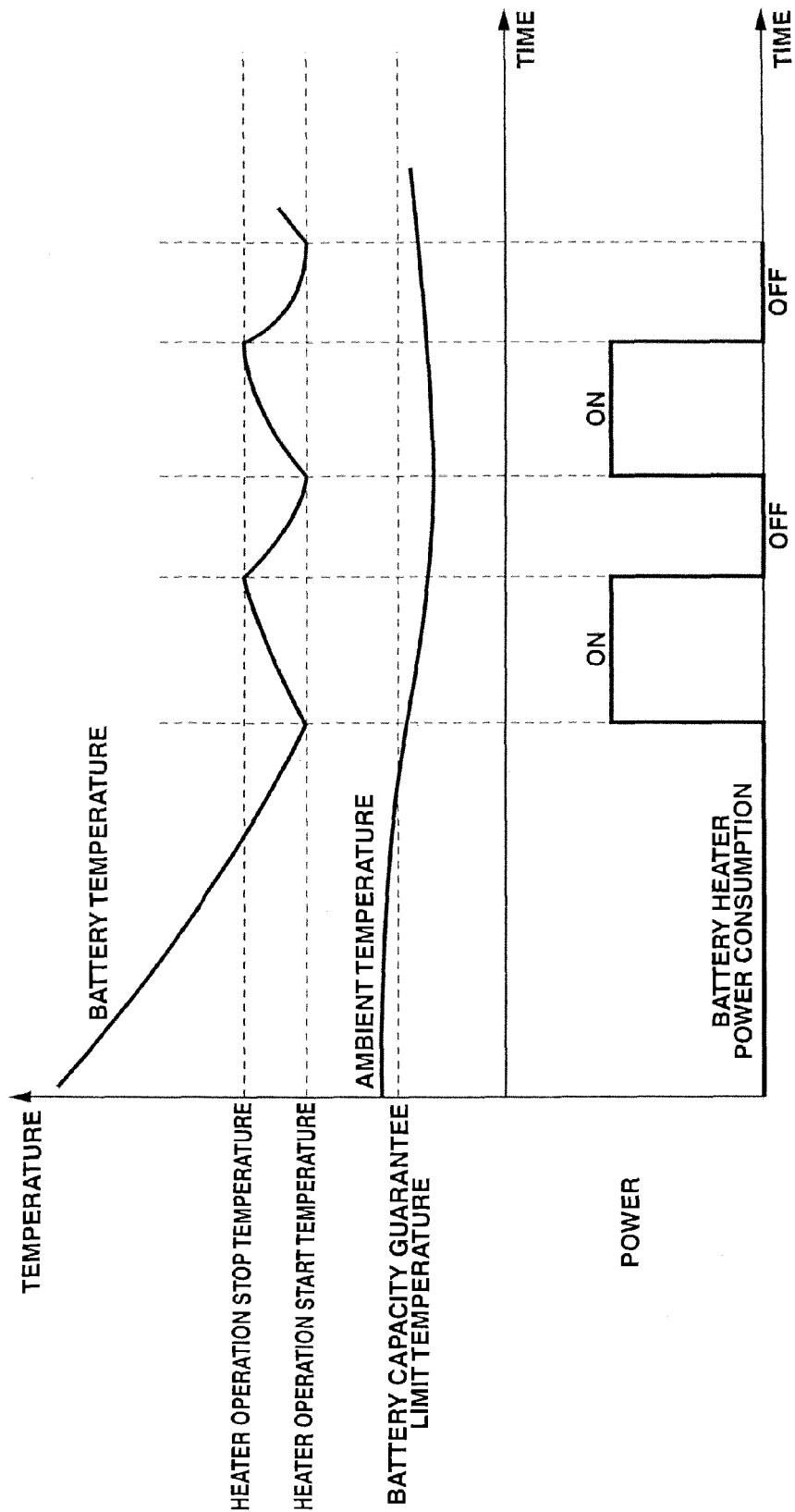
FIG. 2 is a time chart showing behavior of battery temperature and power consumption of a battery heater during an operation of the battery heater.

FIG. 2 is a time chart showing behavior of battery temperature and power consumption of battery heater 15 during an operation of battery heater 15 in Embodiment 1. At the time at which the vehicle travelling is finished, the temperature of battery 11 becomes higher than an ambient temperature due to the heat generation in battery 11 which is caused by discharge of battery 11 during the vehicle travelling. After that, during leaving the vehicle, the temperature of battery 11 is gradually lowered toward the ambient temperature. In a case where the ambient temperature is extremely low, the battery heating is carried out by battery heater 15 in order to prevent the temperature of battery 11 from reaching a battery capacity guarantee limit temperature that corresponds to the capacity deteriorating temperature and the electrolyte freezing temperature of battery 11.

Battery heater 15 has a heater operation start temperature and a heater operation stop temperature higher than the heater operation start temperature, which both are previously set. When the temperature of battery 11 detected by battery temperature sensor 14 reached the heater operation start temperature, battery heater 15 is started the operation. At the time at which the temperature of battery 11 is increased up to the heater operation stop temperature, battery heater 15 stops the operation. By the operation of battery heater 15, battery 11 can be kept at a predetermined temperature or higher. In a case where battery heater 15 is a low output heater, it is usually taken several time until the temperature of battery 11 is increased from the heater operation start temperature to the heater operation stop temperature, and it is usually required several hours until the temperature of battery 11 is reduced from the heater operation stop temperature to the heater operation start temperature. Further, the operation of battery heater 15 is carried out on the basis of the temperature of battery 11, and independent of state of charge of battery 11 and the like. Accordingly, on the side of the charge system, even in a sleep state of the charge system, it is necessary to periodically or non-periodically check the operating state of battery heater 15.

Figure 3:
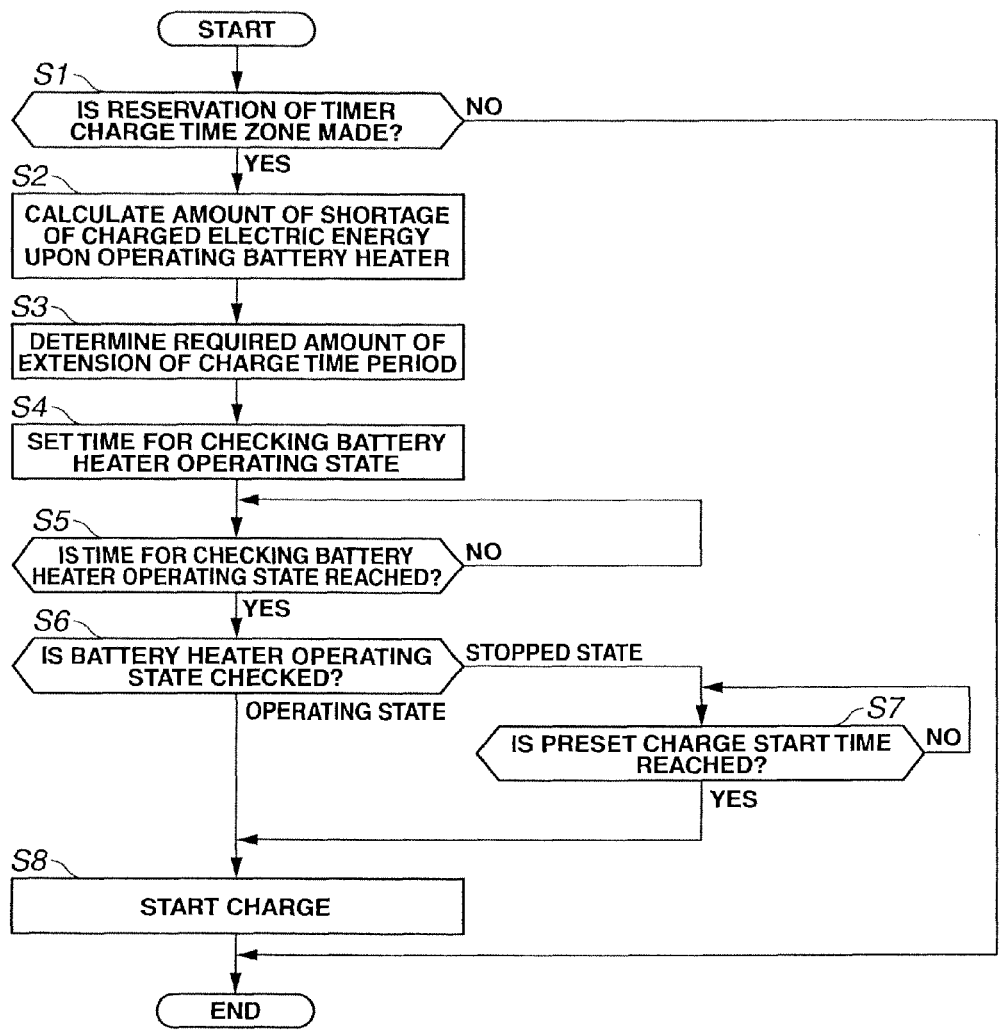
FIG. 3 is a flow chart showing a timer charge control processing that is executed in the charge control apparatus according to Embodiment 1.

FIG. 3 is a flow chart showing a timer charge control processing that is executed in the charge control apparatus according to Embodiment 1.

In step S1, it is judged whether or not reservation of a timer charge time zone is made. If it is judged that reservation of the timer charge time zone is not made, the logic flow is ended. If it is judged that reservation of the timer charge time zone is made, the logic flow proceeds to step S2.

In step S2, an amount of shortage of charged electric energy upon operating battery heater 15 is calculated.

Specifically, a consumed electric energy is calculated by multiplying an electric power consumed by battery heater 15 by a charge time period.

In step S3, a required amount of extension of a charge time period is determined. The required amount of extension of a charge time period is a time period required for charging battery 11 with the consumed electric energy calculated.

In step 4, a time obtained by advancing a preset charge start time by the required amount of extension of a charge time period is set as a time for checking an operating state of battery heater 15.

In step S5, it is judged whether or not the time for checking an operating state of battery heater 15 is reached. If it is judged that the time for checking an operating state of battery heater 15 is reached, the logic flow proceeds to step S6. If it is judged that the time for checking an operating state of battery heater 15 is not reached, the judgment in step S5 is repeated. At this time, the charge system is in a sleep state. When the time for checking an operating state of battery heater 15 is reached, the charge system is started up to carry out various checking operations.

In step S6, the charge system is started up to check an operating state of battery heater 15. If battery heater 15 is in an operating state, the logic flow proceeds to step S8 in which charge of battery 11 is started. If battery heater 15 is in a stopped state, the logic flow proceeds to step S7. In other words, in the sleep state before starting the charge system, it is judged whether or not the time for checking an operating state of battery heater 15 is reached, by counting with a timer, and a main charge system that carries out various state checking operations is not started up. Accordingly, in the sleep state of the charge system, power consumption is brought into an extremely small state.

In step S7, it is judged whether or not the preset charge start time is reached. If it is judged that the preset charge start time is reached, the logic flow proceeds to step S8 in which charge of battery 11 is started. If it is judged that the preset charge start time is not reached, the judgment in step S7 is repeated.

Figure 4:
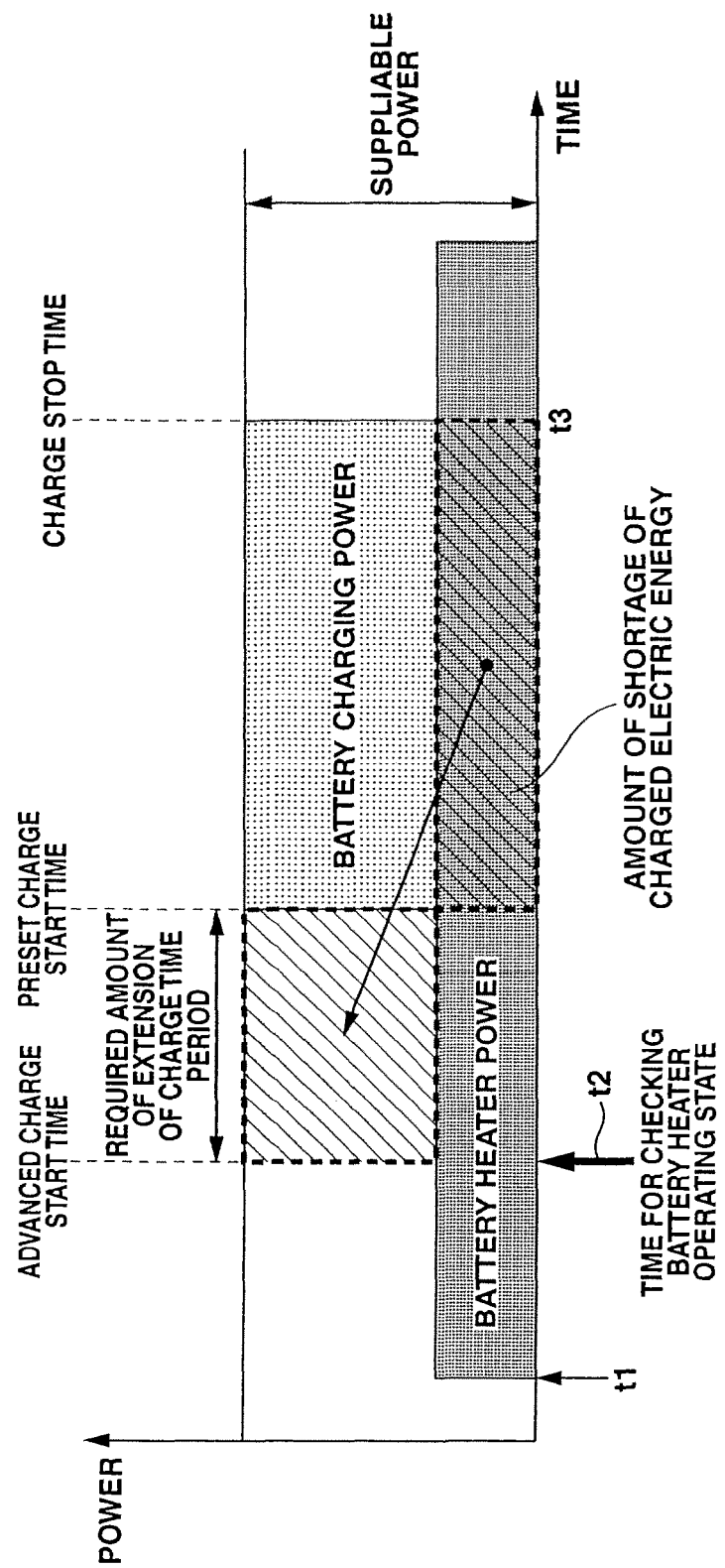
FIG. 4 is a time chart showing a timer charge control processing according to Embodiment 1.

FIG. 4 is a time chart showing a timer charge control processing according to Embodiment 1. An initial state of the time chart indicates that external power source 50 and electric vehicle 100 are connected with each other through outlet cable 40 by a user, and a charge start time and a charge stop time are set through interface device 25 by the user. Further, external power source 50 has a limitation of suppliable electric power, and supplies the electric power within the limitation. In this state, ambient temperature is lower than the battery capacity guarantee limit temperature. In other words, the temperature of battery 11 becomes lower than the heater operation start temperature by leaving battery 11.

At time t1 at which the battery temperature becomes lower than the heater operation start temperature, battery heater 15 is operated to start heating battery 11. This stage is before the charge start time. In a stage where the charge start time and the charge stop time are set by the user, charge control device 21 calculates a required amount of extension of a charge time period which is required in a case where it is assumed that an operation of battery heater 15 is continuously carried out without being interrupted during a time period between the charge start time and the charge stop time, and sets an advanced time for checking an operating state of battery heater 15 which is advanced relative to a preset charge start time.

At time t2 at which a time for checking an operating state of battery heater 15 is reached, in a case where battery heater 15 is operated, charge of battery 11 is instantly started. Accordingly, in other words, the time for checking an operating state of battery heater 15 is an advanced charge start time. As a result, it is possible to compensate an amount of shortage of charged electric energy which is caused by the operation of battery heater 15.

Since the charge has been already started from time t2, even when battery heater 15 is continuously operated after the charge start time, a time at which full charge of battery 11 is attained will not come after a charge stop time at time t3. In other words, even when battery heater 15 is operated, it is possible to achieve the full charge state at the charge stop time.

Embodiment 1 as described above can perform the following function and effect.

(1) The charge control apparatus includes battery 11 that can be electrically charged and discharged, battery heater 15 that heats battery 11, battery temperature sensor (battery temperature detecting section) 14 that detects the temperature of battery 11, battery control device (battery control section) 12 that monitors the temperature of battery 11 and controls battery heater 15 so as to heat battery 11, battery charger 22 that supplies an electric power to battery 11 and battery heater 15, interface device (timer charge reservation section) 25 through which a user is allowed to optionally designate a predetermined charge time zone and a target charge amount (that is, a target amount of electric energy charged to battery 11), and charge control device (charge control section) 21 that carries out the timer charge based on a timer charge start time previously designated through interface device 25. At a time earlier by a predetermined time period than the timer charge start time, charge control device 21 judges whether or not the timer charge start time should be advanced in accordance with an operating state of the battery heater.

Specifically, in a case where battery charging power is dropped due to simultaneous implementation of the timer charge and the battery heating, charge of battery 11 must be continuously carried out until reaching the charge stop time or later in order to further charge battery 11. In contrast, by checking whether or not a shortage of a charged electric energy occurs at a time earlier by a predetermined time period than the charge start time, when charge of battery 11 is necessary at a time other than the timer charge time zone, a charge time period can be prolonged by advancing the charge start time so that occurrence of the shortage of the charged electric energy at the charge stop time can be avoided. Further, since battery 11 can be heated during the timer charge operation, it is not necessary to enhance a required capacity of battery heater 15, and therefore, avoid increase in cost. Further, during charge of battery 11, battery 11 is charged while operating battery heater 15. Therefore, it is possible to avoid reduction in charging efficiency.

(2) The predetermined time period that is checked by charge control device 21 is a required amount of extension of a charge time period (predetermined time period) which is required to charge a consumed electric energy calculated as an electric energy that is consumed in a case where heating by the battery heater is continuously carried out in the timer charge time zone.

Accordingly, even in a case where the consumed electric energy is increased due to actuation of battery heater 15 in the whole range of the timer charge time zone, it is possible to ensure a charge time that compensates the increase in the consumed electric energy and avoid occurrence of a shortage of a charged electric energy at the charge stop time with higher accuracy.

Embodiment 2

Figure 5:
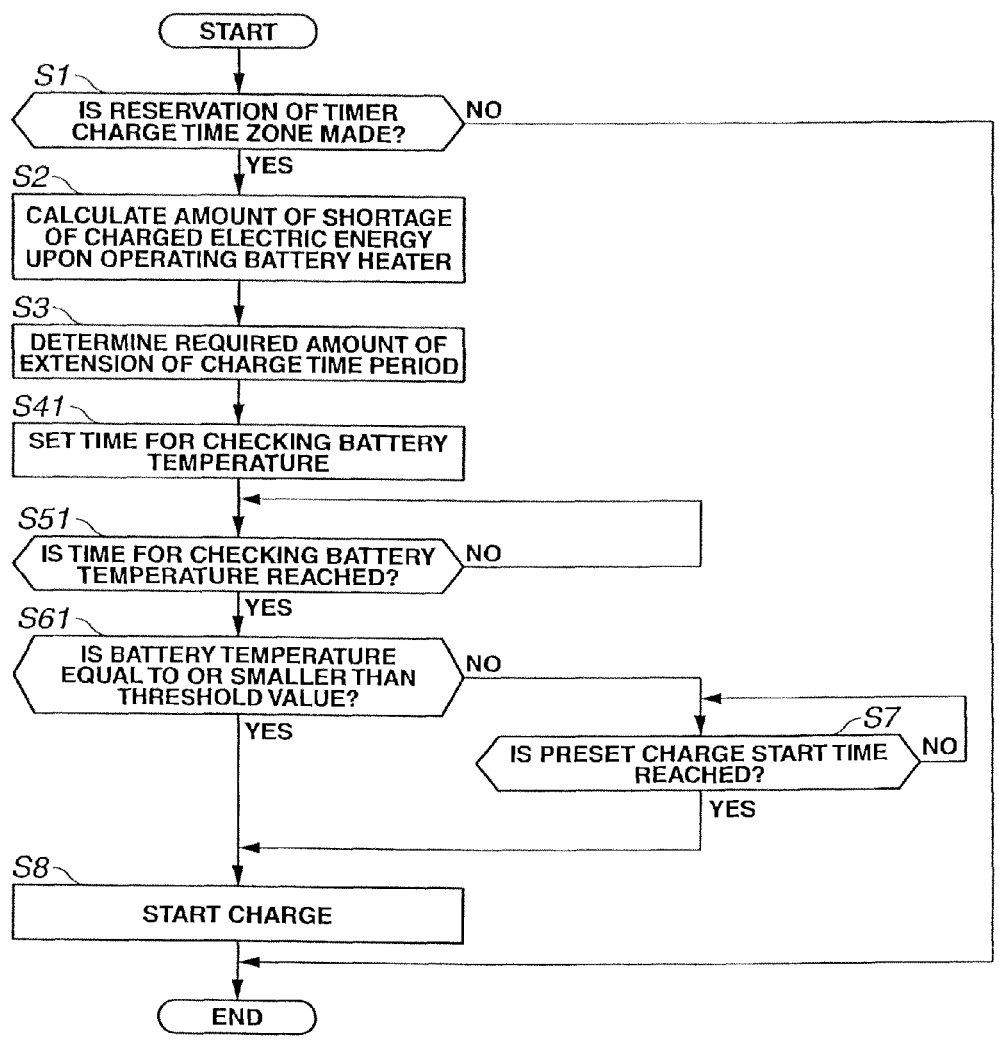
FIG. 5 is a flow chart showing a timer charge control processing that is executed in a charge control apparatus according to Embodiment 2.

Next, Embodiment 2 is explained. The basic construction is the same as that of Embodiment 1, and therefore, only structural features that are different from those of Embodiment 1 are explained. FIG. 5 is a flow chart showing a timer charge control processing that is executed in a charge control apparatus according to Embodiment 2. Although in Embodiment 1, it is judged whether or not the timer charge start time is advanced on the basis of operation/nonoperation of battery heater 15, Embodiment 2 differs from Embodiment 1 in that it is judged whether or not the timer charge start time is advanced on the basis of battery temperature.

In step S1, it is judged whether or not reservation of a timer charge time zone is made. If it is judged that reservation of the timer charge time zone is not made, the logic flow is ended. If it is judged that reservation of the timer charge time zone is made, the logic flow proceeds to step S2.

In step S2, an amount of shortage of charged electric energy upon operating battery heater 15 is calculated. Specifically, a consumed electric energy is calculated by multiplying an electric power consumed by battery heater 15 by a charge time period.

In step S3, a required amount of extension of a charge time period is determined. The required amount of extension of a charge time period is a time period required for charging battery 11 with the consumed electric energy calculated.

In step 41, a time obtained by advancing a preset charge start time by the required amount of extension of a charge time period is set as a time for checking a battery temperature.

In step S51, it is judged whether or not the time for checking a battery temperature is reached. If it is judged that the time for checking a battery temperature is reached, the logic flow proceeds to step S61. If it is judged that the time for checking a battery temperature is not reached, the judgment in step S51 is repeated. At this time, the charge system is in a sleep state. When the time for checking a battery temperature is reached, the charge system is started up to carry out various checking operations.

In step S61, the battery temperature is checked, and if it is judged that the battery temperature is equal to or smaller than a threshold value that is a heater operation stop temperature, the logic flow proceeds to step S8 in which charge of battery 11 is started. If it is judged that the battery temperature is larger than the threshold value that is the heater operation stop temperature, the logic flow proceeds to step S7.

In step S7, it is judged whether or not a preset charge start time is reached. If it is judged that the preset charge start time is reached, the logic flow proceeds to step S8 in which charge of battery 11 is started. If it is judged that the preset charge start time is not reached, the judgment in step S8 is repeated.

Figure 6:
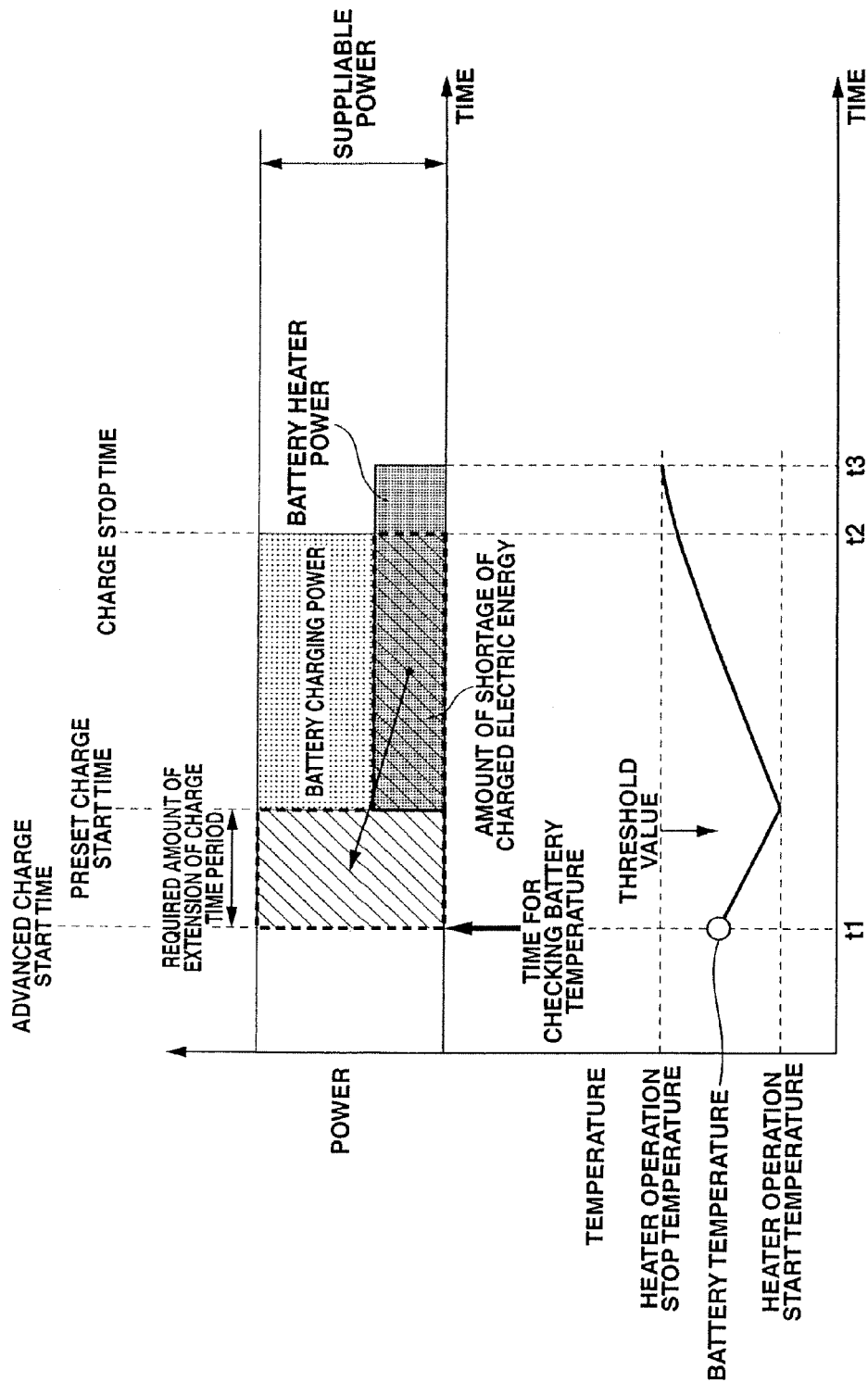
FIG. 6 is a time chart showing a timer charge control processing according to Embodiment 2.

FIG. 6 is a time chart showing a timer charge control processing according to Embodiment 2. An initial state of the time chart indicates that external power source 50 and electric vehicle 100 are connected with each other through outlet cable 40 by a user, and a charge start time and a charge stop time are set through interface device 25 by the user. Further, external power source 50 has a limitation of suppliable electric power, and supplies the electric power within the limitation. In this state, the ambient temperature is lower than the battery capacity guarantee limit temperature. In other words, the temperature of battery 11 becomes lower than the heater operation start temperature by leaving battery 11.

In a stage where the charge start time and the charge stop time are set by the user, charge control device 21 calculates a required amount of extension of a charge time period which is required in a case where it is assumed that an operation of battery heater 15 is continuously carried out without being interrupted during a time period between the charge start time and the charge stop time, and sets a time for checking a battery temperature which is advanced relative to a preset charge start time.

At time t1 at which the time for checking a battery temperature is reached, in a case where the battery temperature is not higher than a heater operation stop temperature, it is judged that there is a high possibility that battery heater 15 is operated during charge of battery 11, and charge of battery 11 is instantly started. Accordingly, in other words, the time for checking the battery temperature is an advanced charge start time. As a result, it is possible to compensate an amount of shortage of charged electric energy which is caused by the operation of battery heater 15.

Since the charge of battery 11 has been already started from time t1, even if battery heater 15 is continuously operated even after the charge start time, a time at which full charge of battery 11 is attained will not come after a charge stop time at time t2. In other words, even when battery heater 15 is operated, it is possible to achieve the full charge state at the charge stop time. After that, at time t3 at which the battery temperature reaches the heater operation stop temperature, the operation of battery heater 15 is stopped.

As explained above, in Embodiment 2, in a case where the battery heating is already carried out in a stage preceding the timer charge start time by the required amount of extension of a charge time period, the battery temperature should not be higher than the heater operation stop temperature, and there is a high probability that the operation of battery heater 15 will be still continued. On the other hand, in a case where the battery temperature is not higher than the heater operation stop temperature even when the battery heating is not carried out, there is a high possibility that the battery temperature will be lowered to the heater operation start temperature afterwards. In such a case, battery heater 15 is operated. Accordingly, by judging that the timer charge and the battery heating are simultaneously carried out, even in a case where battery heater 15 is not operated, a shortage of a charged electric energy is not caused. As a result, it is possible to avoid occurrence of a shortage of a charged electric energy at the charge stop time.

Embodiment 3

Figure 7:
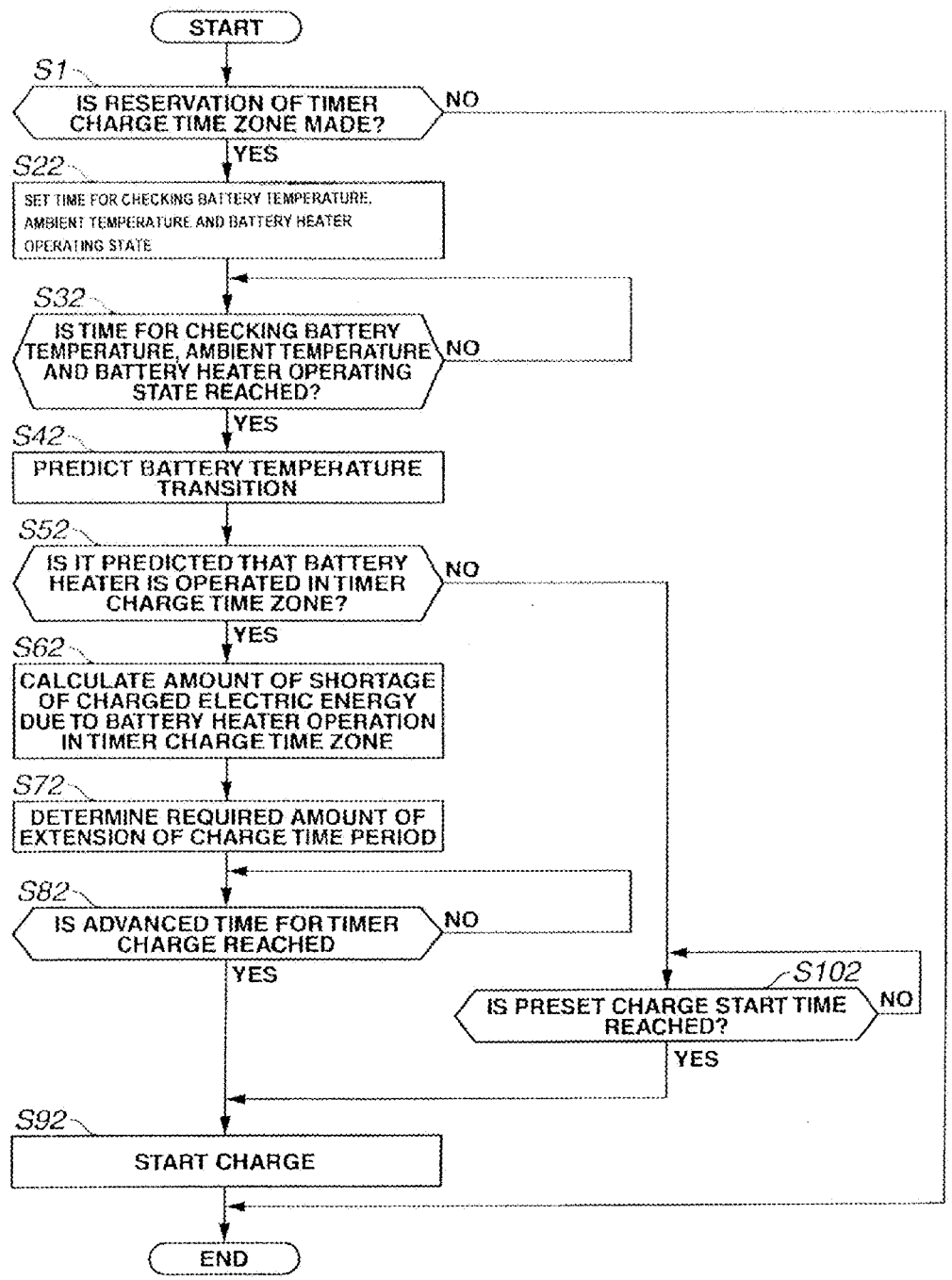
FIG. 7 is a flow chart showing a timer charge control processing that is executed in a charge control apparatus according to Embodiment 3.

Next, Embodiment 3 is explained. The basic construction is the same as that of Embodiment 1, and therefore, only structural features that are different from those of Embodiment 1 are explained. FIG. 7 is a flow chart showing a timer charge control processing that is executed in a charge control apparatus according to Embodiment 3. Although in Embodiments 1 and 2, the required amount of extension of a charge time period by which the timer charge start time is advanced is set on the basis of the case where battery heater 15 is continuously operated during charge of battery 11. That is, the time advanced by the required amount of extension of a charge time period is identical with the time for checking the battery heater operating state and the battery temperature. In contrast, Embodiment 3 differs from Embodiments 1 and 2 in that the operating state of battery heater 15 is predicted with high accuracy and the required amount of extension of a charge time period is computed on the basis of the predicted operating state of battery heater 15.

In step S1, it is judged whether or not reservation of a timer charge time zone is made. If it is judged that reservation of the timer charge time zone is not made, the logic flow is ended. If it is judged that reservation of the timer charge time zone is made, the logic flow proceeds to step S22.

In step S22, a checking time for checking a battery temperature, an ambient temperature and a battery heater operating state is set. The checking time is a time that is obtained by calculating consumed electric energy by multiplying an electric power consumed by battery heater 15 by a charge time period, and advancing the timer charge start time by a time period required for charging battery 11 with the consumed electric energy calculated.

In step S32, it is judged whether or not the checking time is reached. If it is judged that the checking time is reached, the logic flow proceeds to step S42. If it is judged that the checking time is not reached, the judgment in step S32 is repeated. At this time, the charge system is in a sleep state. When the checking time is reached, the charge system is started up to carry out various checking operations.

In step S42, transition of the battery temperature is predicted. Specifically, the battery temperature at the checking time is determined as an initial value, and an arithmetic expression of temperature drop characteristic when the battery temperature is dropped to a value corresponding to the ambient temperature is previously set. Then, on the basis of the arithmetic expression, it is predicted and computed how many hours elapse until the battery temperature is dropped to a heater operation start temperature. Conversely, after battery heater 15 is operated, it is predicted and computed how many hours further elapse until the battery temperature is raised up to a heater operation stop temperature. As a result, it is possible to predict the transition of the battery temperature which includes a timing at which the timer charge and the battery heating are simultaneously carried out.

In step S52, it is judged whether or not it is predicted that battery heater 15 is operated in a timer charge time zone, that is, whether or not a predicted battery temperature becomes not higher than the heater operation start temperature in the timer charge time zone. If it is predicted that the predicted battery temperature is dropped to not higher than the heater operation start temperature in the timer charge time zone, the logic flow proceeds to step S62. On the other hand, if it is predicted that the predicted battery temperature is not dropped to not higher than the heater operation start temperature in the timer charge time zone, the logic flow proceeds to step S102. In step S102, it is judged whether or not a preset timer charge start time is reached. If it is judge that the preset timer charge start time is reached, the logic flow proceeds to step S92 in which charge of battery 11 is started. If it is judge that the preset timer charge start time is not reached, the judgment in step S102 is repeated.

In step S62, an amount of shortage of charged electric energy which is caused by the operation of battery heater 15 in the timer charge time zone is calculated. Specifically, a predicted operating time in which it is predicted that battery heater 15 is operated, is computed on the basis of the predicted battery temperature. Further, consumed electric energy that is obtained by multiplying an electric power consumed by battery heater 15 by the predicted operating time is determined as an amount of shortage of charged electric energy.

In step S72, a required amount of extension of a charge time period is determined, and an advanced time for timer charge which is advanced relative to the preset timer charge start time by the required amount of extension of a charge time period is set. Specifically, a time period required for compensating the amount of shortage of charged electric energy is determined.

In step S82, it is judged whether or not the advanced time for timer charge is reached. If it is judged that the advanced time for timer charge is reached, the logic flow proceeds to step S92 in which charge of battery 11 is started. If it is judged that the advanced time for timer charge is not reached, the judgment in step S82 is repeated.

Figure 8:
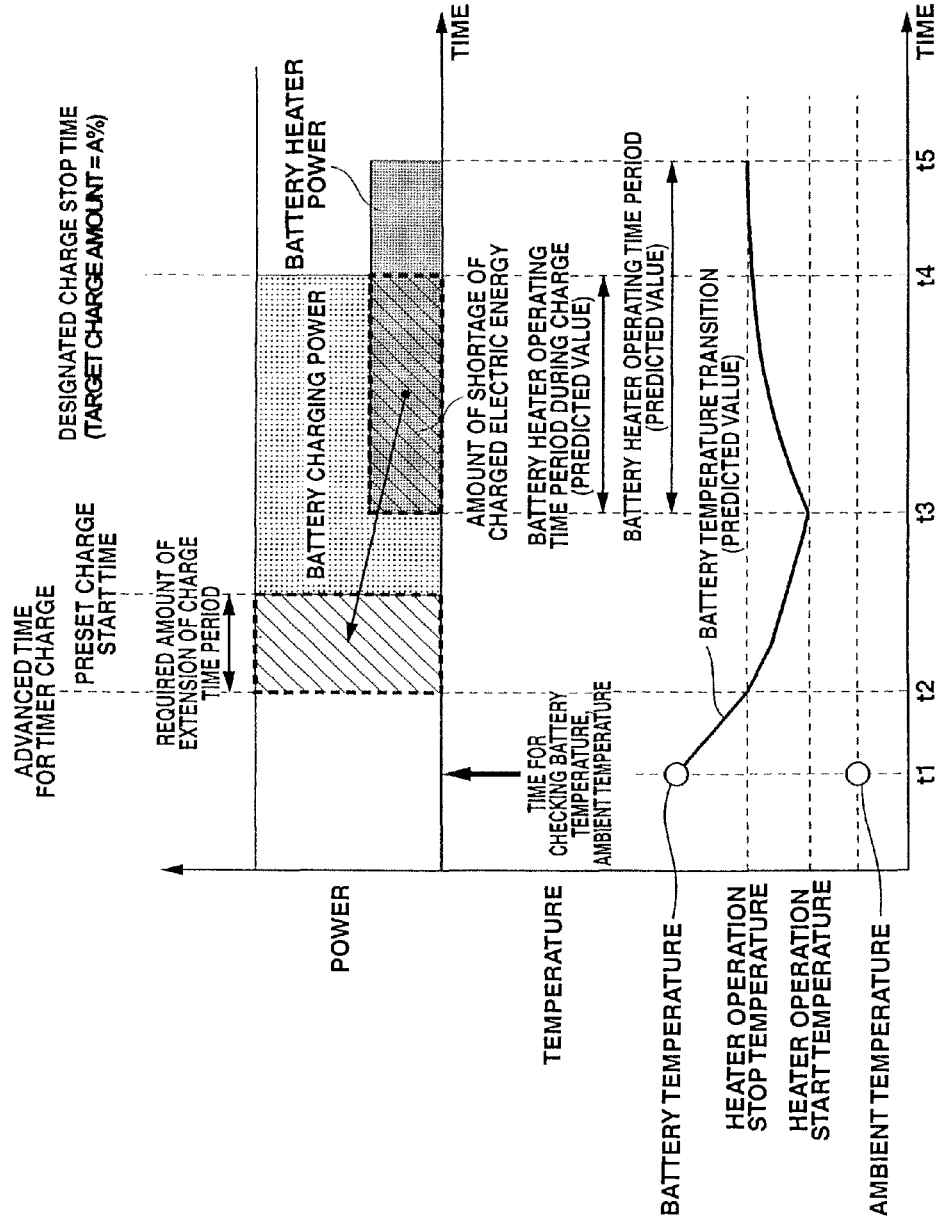
FIG. 8 is a time chart showing a timer charge control processing according to Embodiment 3.

FIG. 8 is a time chart showing a timer charge control processing according to Embodiment 3. An initial state of the time chart indicates that external power source 50 and electric vehicle 100 are connected with each other through outlet cable 40 by a user, and a charge start time and a charge stop time are set through interface device 25 by the user. Further, external power source 50 has a limitation of suppliable electric power, and supplies the electric power within the limitation. In this state, the ambient temperature is lower than the battery capacity guarantee limit temperature. In other words, the temperature of battery 11 is lower than the heater operation start temperature by leaving battery 11.

In a stage where the charge start time and the charge stop time are set by the user, charge control device 21 calculates a required amount of extension of a charge time period which is required in a case where an operation of battery heater 15 is continuously carried out without being interrupted during a time period between the charge start time and the charge stop time, and sets a time for checking a battery temperature, an ambient temperature and a battery heater operating state which is advanced relative to a preset charge start time.

At time t1 at which the time for checking the battery temperature is reached, transition of the battery temperature is predicted. At this time, since it is predicted that battery heater 15 is operated in a time period from time t3 to time t4 which is fallen within the timer charge time zone, a required amount of extension of a charge time period which corresponds to electric power consumed in the time period from time t3 to time t4 is computed. Further, an advanced time for timer charge which is advanced relative to the preset charge start time by the required amount of extension of a charge time period is set. As a result, it is possible to compensate an amount of shortage of charged electric energy which is caused by the operation of battery heater 15.

At time t2 at which the advanced time for timer charge is reached, the timer charge is started. At time t3, battery heater 15 is operated, but a time at which full charge of battery 11 is attained will not come after time t4 that is the charge stop time. In other words, even when battery heater 15 is operated, it is possible to achieve the full charge state at the charge stop time t4. After that, at time t5 at which the battery temperature reaches the heater operation stop temperature, the operation of battery heater 15 is stopped.

As explained above, in Embodiment 3, the charge control apparatus includes ambient temperature sensor (ambient temperature detecting section) 26. At the checking time advanced relative to the timer charge start time by the predetermined time period, charge control device 21 predicts transition of the battery temperature in the timer charge time zone from the battery heater operating state, the battery temperature and the ambient temperature at the checking time. In a case where charge control device 21 predicts that the battery temperature predicted is within a preset range of battery heater operating temperature, charge control device 21 judges that the timer charge and the battery heating are simultaneously carried out.

Charge control device 21 predicts and computes an operating time and a consumed electric power of battery heater 15 in the timer charge time zone on the basis of the predicted battery temperature, and determines a required amount of extension of a charge time period. That is, in a case where battery heater 15 is operated in only a part of the timer charge time zone, the charge start time is advanced by an amount of electric energy consumed due to the operation of battery heater 15. Therefore, the charge start time is not too much advanced, so that charge of battery 11 can be completed in conformity with the charge stop time as designated by the user.

Embodiment 4

Figure 9:
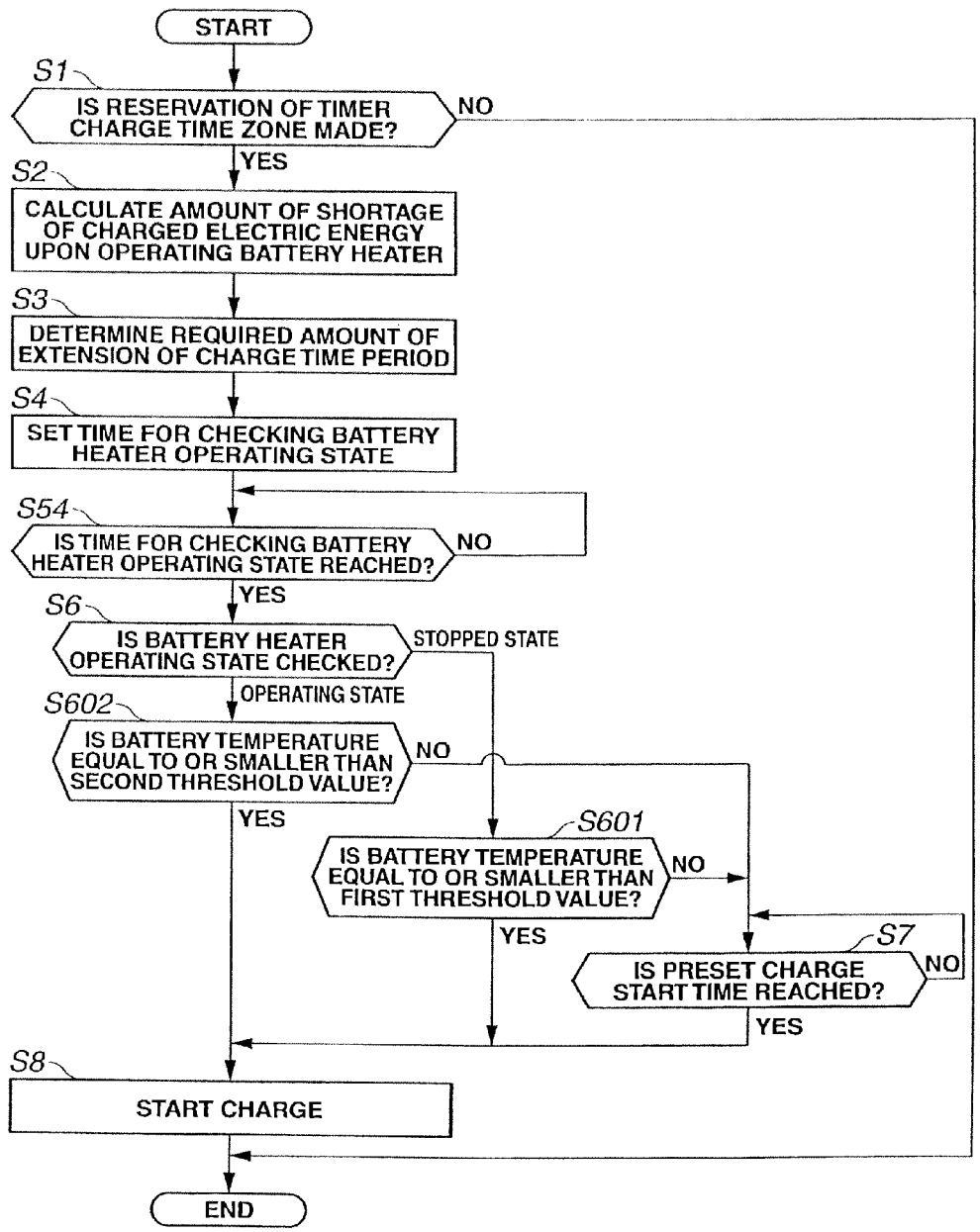
FIG. 9 is a flow chart showing a timer charge control processing that is executed in a charge control apparatus according to Embodiment 4.

Next, Embodiment 4 is explained. The basic construction is the same as those of Embodiments 1 and 2, and therefore, only structural features that are different from those of Embodiments 1 and 2 are explained. FIG. 9 is a flow chart showing a timer charge control processing that is executed in a charge control apparatus according to Embodiment 4. Although in Embodiments 1 and 2, at the time advanced relative to the timer charge start time by the required amount of extension of a charge time period, one of the operating state of battery heater 15 and the battery temperature is checked. In contrast, Embodiment 4 differs from Embodiments 1 and 2 in that both the operation of battery heater 15 and the battery temperature are checked.

In step S1, it is judged whether or not reservation of a timer charge time zone is made. If it is judged that reservation of the timer charge time zone is not made, the logic flow is ended. If it is judged that reservation of the timer charge time zone is made, the logic flow proceeds to step S2.

In step S2, an amount of shortage of charged electric energy upon operating battery heater 15 is calculated.

Specifically, an amount of consumed electric energy is calculated by multiplying an electric power consumed by battery heater 15 by a charge time period.

In step S3, a required amount of extension of a charge time period is determined. The required amount of extension of a charge time period is a time period required for charging battery 11 with the calculated amount of consumed electric energy.

In step 4, a time obtained by advancing the preset charge start time by the required amount of extension of a charge time period is set as a time for checking an operating state of battery heater 15 and the battery temperature.

In step S54, it is judged whether or not the time for checking an operating state of battery heater 15 is reached. If it is judged that the time for checking an operating state of battery heater 15 is reached, the logic flow proceeds to step S6. If it is judged that the time for checking an operating state of battery heater 15 is not reached, the judgment in step S54 is repeated. At this time, the charge system is in a sleep state. When the time for checking an operating state of battery heater 15 is reached, the charge system is started up to carry out various checking operations.

In step S6, it is checked whether or not battery heater 15 is operated. If battery heater 15 is in an operating state, the logic flow proceeds to step S602. If battery heater 15 is in a stopped state, the logic flow proceeds to step S601.

In step S601, it is judged whether or not the battery temperature is equal to or smaller than a first threshold value. If the battery temperature is equal to or smaller than the first threshold value, it is judged that there is a high probability that battery heater 15 is brought into an operating state, and the logic flow proceeds to step S8 in which charge of battery 11 is started. On the other hand, if the battery temperature is larger than the first threshold value, it is judged that there is a low probability that battery heater 15 is brought into an operating state, and the logic flow proceeds to step S7. The first threshold value is a predetermined value that is higher than a heater operation start temperature and lower than a heater operation stop temperature.

In step S602, it is judged whether or not the battery temperature is equal to or smaller than a second threshold value. If the battery temperature is higher than the second threshold value, it is judged that there is a high probability that the operation of battery heater 15 is stopped, and the logic flow proceeds to step S7. On the other hand, if the battery temperature is equal to or smaller than the second threshold value, it is judged that there is a high probability that the operation of battery heater 15 is still continued, and the logic flow proceeds to step S8 in which charge of battery 11 is started. The second threshold value is a predetermined value that is higher than the heater operation start temperature, lower than a heater operation stop temperature, and higher than the first threshold value.

In step S7, it is judged whether or not a preset charge start time is reached. If it is judged that the preset charge start time is reached, the logic flow proceeds to step S8 in which charge of battery 11 is started. If it is judged that the preset charge start time is not reached, the judgment in step S7 is repeated.

As explained above, in Embodiment 4, even with battery heater 15 being in a stopped state, when the battery temperature is not higher than the first threshold value, charge of battery 11 is started to thereby more certainly avoid occurrence of a shortage of a charge amount. Further, even with battery heater 15 being in an operating state, when the battery temperature is higher than the second threshold value, charge of battery 11 is not started to thereby avoid unnecessary charge of battery 11.

Embodiment 5

Figure 10:
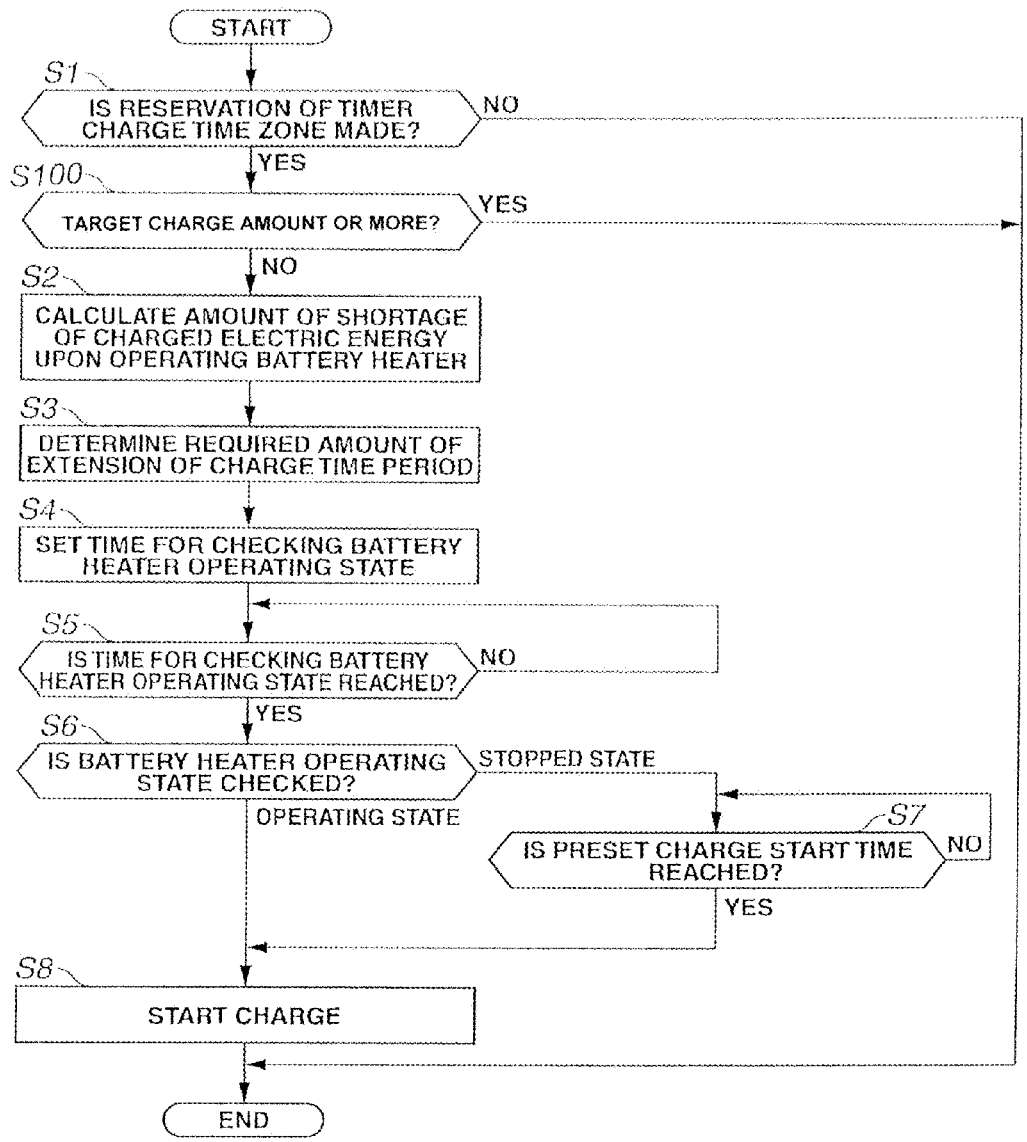
FIG. 10 is a flow chart showing a timer charge control processing that is executed in a charge control apparatus according to Embodiment 5.

Next, Embodiment 5 is explained. The basic construction is the same as that of Embodiment 1, and therefore, only structural features that are different from those of Embodiment 1 are explained. FIG. 10 is a flow chart showing a timer charge control processing that is executed in a charge control apparatus according to Embodiment 5. The flow chart is the same as that of Embodiment 1 except for step S100, and therefore, only the distinct step is explained.

In step S100, it is judged whether or not the current amount of battery charge (that is, the current amount of electric energy charged to battery 11) is equal to or larger than a target charge amount (that is, a target amount of electric energy charged to battery 11). If it is judged that the current amount of battery charge is equal to or larger than the target charge amount, the logic flow is ended. If it is judged that the current amount of battery charge is smaller than the target charge amount, the logic flow proceeds to step S2.

Figure 11:
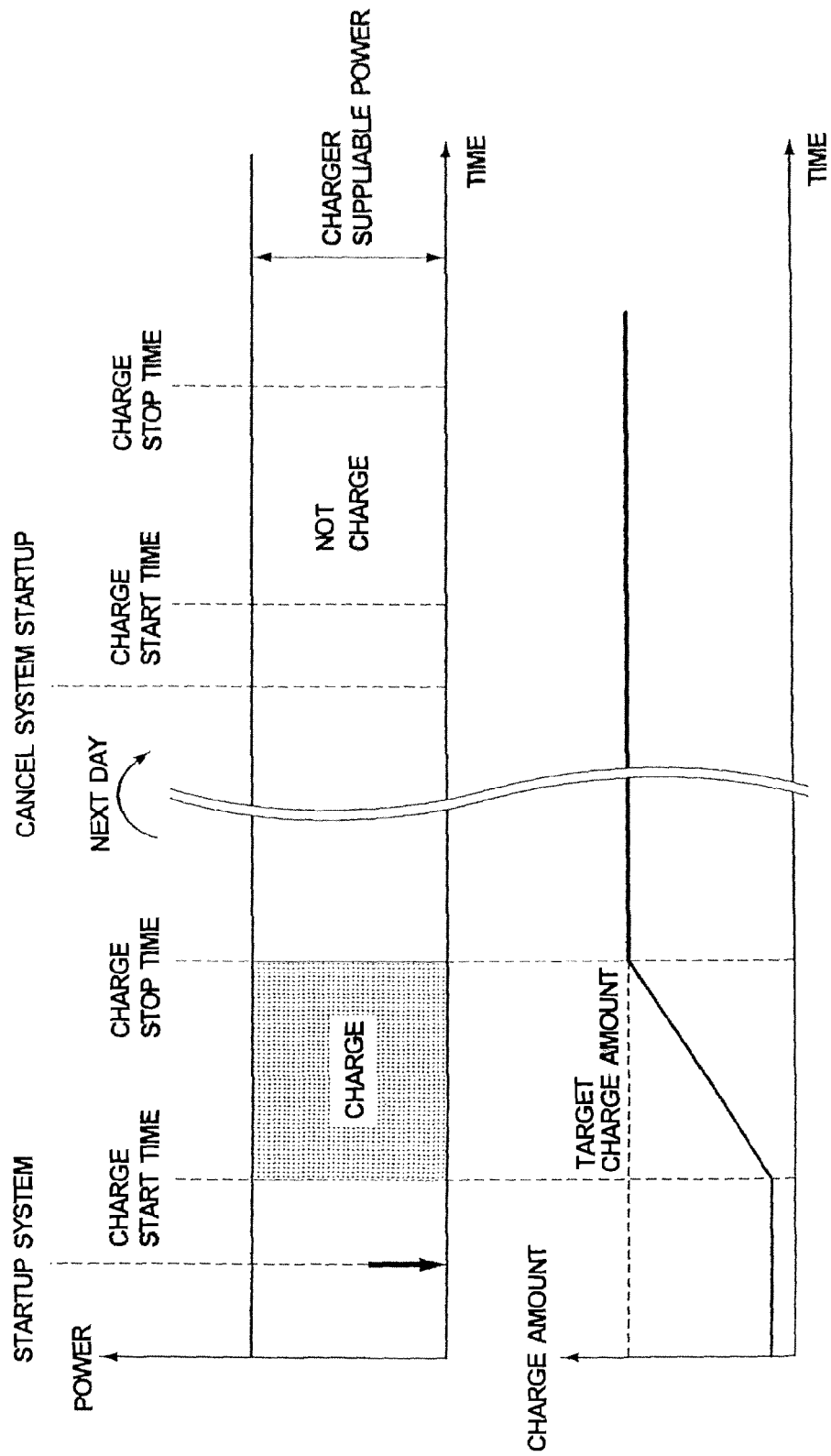
FIG. 11 is a time chart showing a timer charge control processing according to Embodiment 5.

FIG. 11 is a time chart showing a timer charge control processing according to Embodiment 5. Specifically, in a case where timer charge is set to be carried out in a regular time zone every day, the charging operation is repeatedly executed at a designated time. At this time, in such a case that the vehicle is left in a nonuse state for several days, the charging operation is repeatedly executed even through the current amount of battery charge reaches the target charge amount. As a result, it is likely that unnecessary power consumption is caused.

In order to solve the above problem, in step S100, when the amount of battery charge has already reached the target charge amount, the charge system startup before the preset charge start time and the judgment as to whether or not the charge start time should be advanced are cancelled to thereby reduce a frequency of startup of the charge system and suppress unnecessary power consumption. In addition, in Embodiment 5, checking of the target charge amount is carried out between step S1 and S2. However, the checking of the target charge amount may be carried out between step S4 and step S5.

As explained above, in Embodiment 5, the following function and effect can be obtained.

When the amount of battery charge reaches the target charge amount, charge control device 21 cancels a judgment as to whether or not the timer charge start time should be advanced. Accordingly, unnecessary startup of the charge system can be avoided, thereby reducing a frequency of startup of the charge system and suppressing the electric power consumed during a time period in which the vehicle is left in a nonuse state.

Although the present invention is explained on the basis of the above embodiments, the present invention is not limited to these embodiments and may be variously modified within the scope of the present invention. In Embodiment 1, the charge control apparatus is applied to an electric vehicle. However, the charge control apparatus may also be applied to a plug-in hybrid vehicle. In addition, in the above embodiments, the charge start time is advanced by the computed required amount of extension of a charge time period, but the charge start time may be advanced by a time period obtained by adding a margin to the required amount of extension of a charge time period in consideration of safety factor in order to further ensure completion of charge of the battery.

In Embodiment 3, transition of the battery temperature is predicted on the basis of the battery temperature detected at the checking time. However, transition of the battery temperature may be predicted from the battery temperatures which are sampled plural times at any timing before the checking time.

The invention claimed is:

1. A charge control apparatus for a vehicle, comprising:
an electrically chargeable and dischargeable battery;
a battery heater that heats the battery;
a battery temperature detecting section configured to detect a temperature of the battery;
a battery control section configured to monitor the temperature of the battery and controlling the battery heater so as to heat the battery;
a battery charger that supplies electric power to the battery and the battery heater;
a timer charge reservation section configured to allow a user to designate a predetermined timer charge time zone and a target charge amount; and
a charge control section configured to execute timer charge based on a timer charge start time previously designated by the timer charge reservation section,
wherein at a time earlier by a predetermined time period than the timer charge start time, the charge control section judges whether or not the timer charge start time should be advanced in accordance with an operating state of the battery heater.

2. The charge control apparatus for a vehicle as claimed in claim 1, wherein the predetermined time period is a required amount of extension of a charge time period which is required to charge a consumed electric energy calculated as an electric energy that is consumed in a case where heating by the battery heater is continuously carried out in the timer charge time zone.

3. The charge control apparatus for a vehicle as claimed in claim 1, wherein when an amount of battery charge reaches the target charge amount, the charge control section cancels a judgment as to whether or not the timer charge start time should be advanced.

4. A charge control apparatus for a vehicle, comprising:
an electrically chargeable and dischargeable battery;
a battery heater that heats the battery; and
a battery charger that supplies electric power to the battery and the battery heater,
wherein the charge control apparatus detects a temperature of the battery,
wherein the charge control apparatus monitors the temperature of the battery and controls the battery heater so as to heat the battery,
wherein the charge control apparatus allows a user to designate a predetermined timer charge time zone and a target charge amount,
wherein the charge control apparatus executes timer charge based on a timer charge start time previously designated, and
wherein at a time earlier by a predetermined time period than the timer charge start time, the charge control apparatus judges whether or not the timer charge start time should be advanced in accordance with an operating state of the battery heater.

* * * * *